(12) United States Patent
Takeda et al.

(10) Patent No.: US 8,534,713 B2
(45) Date of Patent: Sep. 17, 2013

(54) CONNECTING STRUCTURE OF A DOUBLE TUBE

(75) Inventors: Noriyuki Takeda, Tokyo (JP); Shoichi Doi, Hyogo (JP)

(73) Assignees: Mitsubishi Heavy Industries, Ltd., Tokyo (JP); Pebble Bed Modular Reactor (Pty) Limited, Centurion (ZA)

( * ) Notice: Subject to any disclaimer, the term of this patent is extended or adjusted under 35 U.S.C. 154(b) by 309 days.

(21) Appl. No.: 12/808,878

(22) PCT Filed: Mar. 27, 2009

(86) PCT No.: PCT/JP2009/056926
§ 371 (c)(1),
(2), (4) Date: Jun. 17, 2010

(87) PCT Pub. No.: WO2009/123299
PCT Pub. Date: Oct. 8, 2009

(65) Prior Publication Data
US 2010/0270788 A1    Oct. 28, 2010

(30) Foreign Application Priority Data

Apr. 3, 2008    (JP) ................................. 2008-097073

(51) Int. Cl.
*F16L 7/02*    (2006.01)
*F16L 23/036*    (2006.01)
(52) U.S. Cl.
USPC ..................... 285/123.3; 285/123.1; 285/368; 285/123.14
(58) Field of Classification Search
USPC .............. 285/123.1, 123.3, 123.15, 368, 412, 285/298, 123.12, 123.13, 123.14
See application file for complete search history.

(56) References Cited

U.S. PATENT DOCUMENTS 3,603,617 A * 9/1971 Lochridge ........................ 285/24
4,429,903 A * 2/1984 Baker .............................. 285/24
(Continued)

FOREIGN PATENT DOCUMENTS

FR    1412589 A    10/1965
JP    9-54189 A    2/1997
(Continued)

OTHER PUBLICATIONS

International Search Report of PCT/JP2009/056926, mailing date of Jul. 2, 2009.
Japanese Office Action mailed May 22, 2012, issued in corresponding Japanese Patent Application No. 2010-524013, with English translation.

*Primary Examiner* — James Hewitt
(74) *Attorney, Agent, or Firm* — Westerman, Hattori, Daniels & Adrian, LLP (57) ABSTRACT

To provide a connecting structure of a double tube and an assembling or disassembling method of the double tube capable of disassembling or repairing an inner tube without cutting an outer tube. A connecting structure (10A) includes an outer tube (11) and an inner tube (12). The outer tube (11) is provided at a location corresponding to a connection flange portion (13) of the inner tube (12) with an outer tube short cylinder (15) including openings (14) each having a lid (14a). The outer tube short cylinder (15) is provided at respective ends with outer tube connection flange portions (16A and 16B). There are provided push-up bolts (21) capable of adjusting gaps respectively between an outer tube connection flange portions (17A-1 and 17A-2) which are opposed to each other, and between an outer tube connection flange portions (17B-1 and 17B-2).

2 Claims, 7 Drawing Sheets

(56) References Cited

U.S. PATENT DOCUMENTS

| | | | |
|---|---|---|---|
| 4,530,526 A * | 7/1985 | Dopyera et al. | 285/261 |
| 5,004,017 A * | 4/1991 | White | 138/106 |
| 5,141,256 A | 8/1992 | Ziu | |
| 6,056,330 A * | 5/2000 | Compton et al. | 285/337 |
| 6,913,291 B1 * | 7/2005 | Betz | 285/123.15 |
| 8,074,687 B2 * | 12/2011 | Queau et al. | 138/112 |
| 2006/0087121 A1 * | 4/2006 | Bradley | 285/415 |

FOREIGN PATENT DOCUMENTS

| | | |
|---|---|---|
| JP | 2003-294883 A | 10/2003 |
| JP | 2004-85372 A | 3/2004 |
| JP | 3971683 B2 | 9/2007 |

\* cited by examiner

CONNECTING STRUCTURE OF A DOUBLE TUBE

TECHNICAL FIELD

The present invention relates to a connecting structure of a double tube in which gas flows through an outer tube and an inner tube, and to an assembling or disassembling method of the double tube.

BACKGROUND ART

Conventionally, a tube of a single structure is normally used as a tube through which fluid such as gas flows to a turbine from a gas source. There is a tube of a double tube structure in which a tube is disposed inside another tube, the inside tube (hereinafter, referred to as "inner tube") is inserted into the outside tube (hereinafter, referred to as "outer tube") in a state where a constant gap is held between the inner and outer tubes, two kinds of gases sent from a supply source located upstream flow through the outer tube and the inner tube, and the gases are supplied to a predetermined discharging destination located downstream (the Publication of Japanese Patent No. 3971683).

Further, such a tube of the double tube structure is also used in a piping system in spent nuclear fuel disposal equipment, radioactive-waste disposal equipment, and nuclear power plant equipment (Japanese Unexamined Patent Application, Publication No. H09-54189 and Japanese Unexamined Patent Application, Publication No. 2003-294883).

However, the conventional double tube structure has a problem that, when the inner tube is to be disassembled in a case of maintenance of a tube connecting device or in a case of repairing operation of a damaged part of the inner tube, the inner tube cannot be disassembled unless the outer tube is cut.

DISCLOSURE OF INVENTION

In view of the above problem, it is an object of the present invention to provide a connecting structure of a double tube and an assembling or disassembling method of the double tube capable of disassembling and repairing the inner tube without cutting the outer tube when maintenance of the tube connecting device is performed or a damaged part of the inner tube is repaired.

In order to achieve the above objects, a first aspect of the present invention provides a connecting structure of a double tube including an outer tube and an inner tube inserted into the outer tube, wherein the outer tube is provided at a location corresponding to a connection flange portion of the inner tube with an outer tube short cylinder including at least one opening each having a lid, the outer tube short cylinder is provided at respective ends with outer tube connection flange portions, and there is provided gap adjusting part capable of adjusting a gap between opposed outer tube connection flanges which constitute the outer tube connection flange portions.

In the above-described connecting structure of the double tube according to the first aspect of the present invention, the gap adjusting part may be provided as at least one push-up bolt located along each of outer peripheries of the outer tube connection flanges.

In the above-described connecting structure of the double tube according to the first aspect of the present invention, the gap adjusting part may be provided as at least two turnbuckles connecting the outer tube connection flanges which are opposed to flanges of the respective ends of the outer tube short cylinder among the outer tube connection flange portions provided on respective ends of the outer tube short cylinder.

In the above-described connecting structure of the double tube, according to the first aspect of the present invention, a connection flange portion of the inner tube may have at least one push-up bolt which is provided along each of outer peripheries of two opposed connection flanges of the inner tube and which adjusts a gap between the connection flanges.

A second aspect of the present invention provides an assembling or disassembling method of a double tube for assembling or disassembling the double tube which includes an outer tube and an inner tube inserted into the outer tube, wherein a gap is formed between outer tube connection flanges of outer tube connection flange portions of the outer tube using a push-up bolt provided in the outer tube connection flange portions, an opening having a lid of an outer tube short cylinder provided in the outer tube at a location corresponding to the connection flange portion of the inner tube is formed, opposed connection flanges constituting connection flange portions of the inner tube are assembled or disassembled while rotating the outer tube short cylinder in a circumferential direction of the inner tube, and the inner tube can be assembled or disassembled without cutting the outer tube.

A third aspect of the present invention provides an assembling or disassembling method of a double tube for assembling or disassembling the double tube which includes an outer tube and an inner tube inserted into the outer tube, wherein of two outer tube connection flange portions provided on respective ends of an outer tube short cylinder including an opening having a lid provided on the outer tube at a location corresponding to connection flange portions of the inner tube, the outer tube connection flanges which are opposed to flanges on the respective ends of the outer tube short cylinder are connected with each other using at least two turnbuckles, a gap is formed between the outer tube connection flanges of the respective outer tube connection flange portions using the turnbuckles, the opening having the lid is opened, the connection flange portions of the inner tube are assembled or disassembled into a connection flange upper portion and a connection flange lower portion while rotating the outer tube short cylinder in a circumferential direction of the inner tube, and the inner tube can be assembled or disassembled without cutting the outer tube.

According to the present invention, the outer tube is provided at the location corresponding to the connection flange portion of the inner tube with the outer tube short cylinder including at least one opening each having a lid, the outer tube short cylinder is provided at the respective ends with outer tube connecting flange portions, and there are provided gap adjusting part capable of adjusting the gap between the opposed outer tube connection flanges which constitute the outer tube connection flange portions. Accordingly, the outer tube short cylinder can be rotated in the circumferential direction of the inner tube. Therefore, when the inner tube is to be assembled or disassembled, it is possible to assemble or disassemble the connection flanges constituting the connection flange portion and to assemble or disassemble the inner tube without cutting the outer tube.

BEST MODE FOR CARRYING OUT THE INVENTION

The present invention will be described in detail with reference to the drawings. The present invention is not limited by the following example. In constituent elements in the following example, there are included those which can easily be assumed by a person skilled in the art and those which are substantially the same as the constituent elements.

A connecting structure of a double tube according to the example of the present invention will be described with reference to the drawings.

Figure 1:
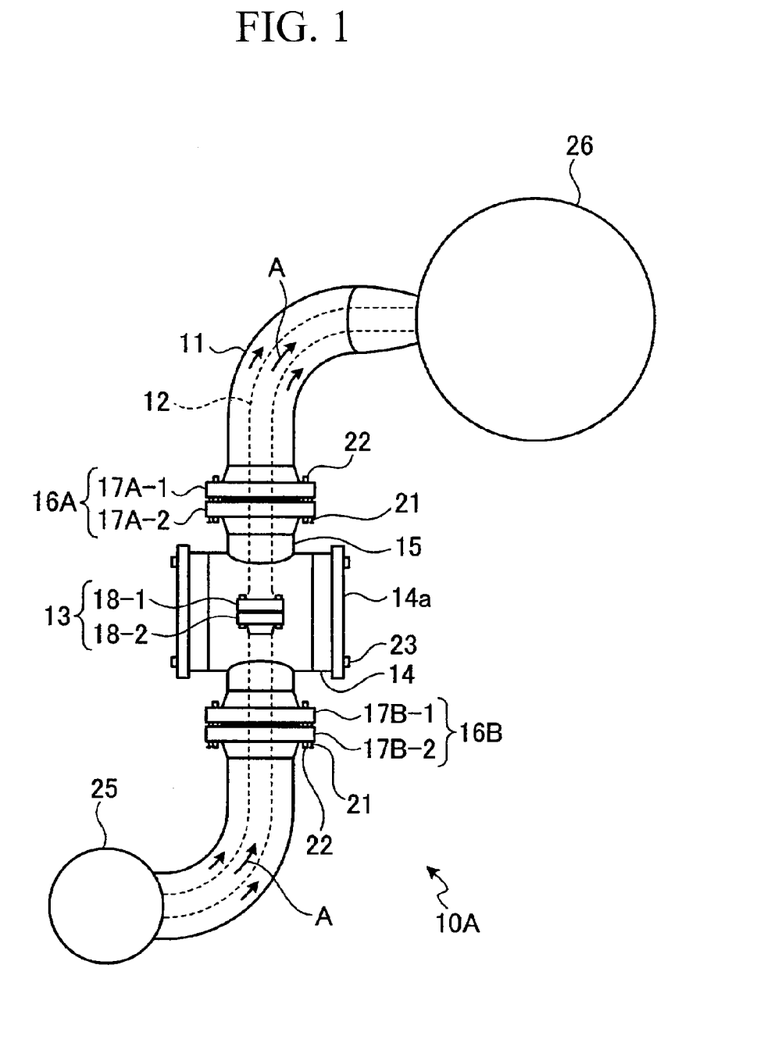
FIG. 1 is a schematic diagram showing a connecting structure of a double tube according to an example of the present invention.
Figure 2:
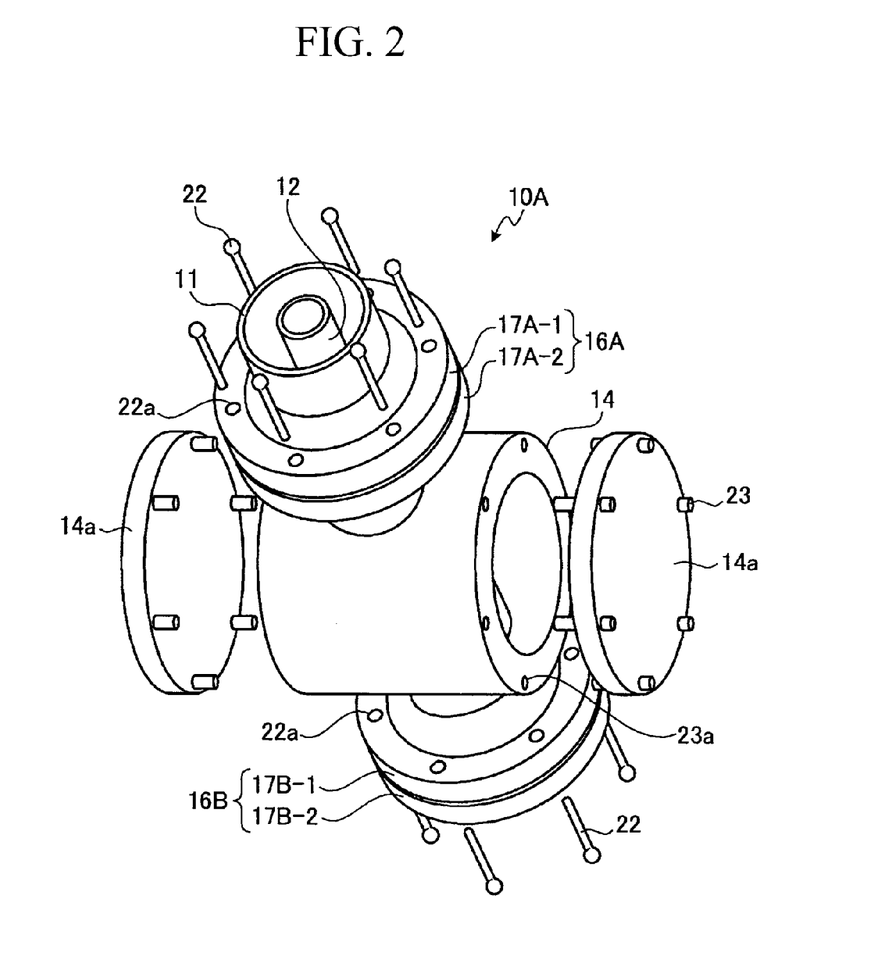
FIG. 2 is a schematic perspective view of the connecting structure of the double tube.

FIG. 1 is a schematic diagram showing the connecting structure of the double tube according to the present example, and FIG. 2 is a schematic perspective view of the connecting structure of the double tube.

As shown in FIGS. 1 and 2, a connecting structure 10A of the double tube according to the present example includes an outer tube 11 and an inner tube 12 inserted into the outer tube 11. The outer tube 11 is provided with an outer tube short cylinder 15 at a location corresponding to a connection flange portion 13 of the inner tube 12. The outer tube short cylinder 15 includes two openings 14 each having a lid 14a. Outer tube connection flange portions 16A and 16B are provided on respective ends of the outer tube short cylinder 15. The connecting structure includes push-up bolts (gap adjusting part) 21 capable of adjusting gaps S (see FIG. 3) between opposed outer tube connection flange upper portion 17A-1 and outer tube connection flange lower portion 17A-2 constituting the outer tube connection flange portion 16A, and between opposed outer tube connection flange upper portion 17B-1 and outer tube connection flange lower portion 17B-2 constituting the outer tube connection flange portion 16B.

Opposed inner tube connection flange upper portion 18-1 and inner tube connection flange lower portion 18-2 constitute the connection flange portion 13 of the inner tube 12. Symbols 22 and 23 represent flange bolts, and symbols 22a and 23a represent flange bolt holes into which the flange bolts are inserted. Although the number of the flange bolts 22 and 23 is six in FIG. 2, the number thereof is not limited to six. The push-up bolts 21 are inserted into push-up bolt holes 21a shown in FIG. 4, and the flange bolts 22 and 23 are inserted into the flange bolt holes 22a and 23a shown in FIG. 2, respectively.

Gas A passes respectively through the outer tube 11 and inner tube 12. The gas A is fluid which is gas or liquid supplied from the outer tube 11 and the inner tube 12. Examples of the gas A include safe gas and liquid such as inert gas composed of nitrogen gas or argon gas which is heated to high temperature by heat emitted from a high temperature gas furnace and is supplied to a turbine.

Material of the outer tube 11 and the inner tube 12 may appropriately be selected in accordance with properties of the gas A passing therethrough and the surrounding environment. Examples of the tubes include steel tubes, stainless steel tubes, iron tubes, resin tubes, and iron tubes having resin-coated inner surfaces.

In the connecting structure 10A of the double tube according to the present example, the outer tube connection flange portions 16A and 16B of the outer tube 11, and the connection flange portion 13 of the inner tube 12 are normally closed, and the gas A supplied from a gas source 25 passes through the outer tube 11 and the inner tube 12, and is supplied to a turbine 26.

Assembling and disassembling methods of the double tube having the connecting structure will be described.

Figure 3:
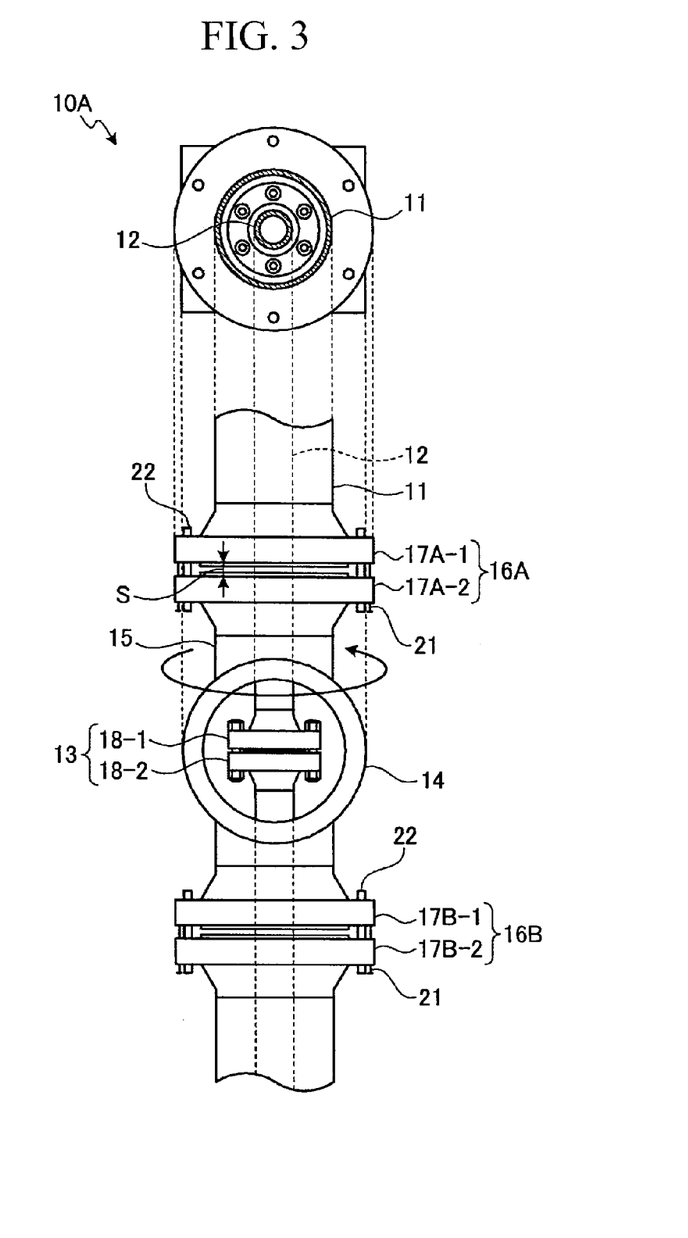
FIG. 3 is a schematic diagram showing a configuration of the connecting structure of the double tube.
Figure 4:
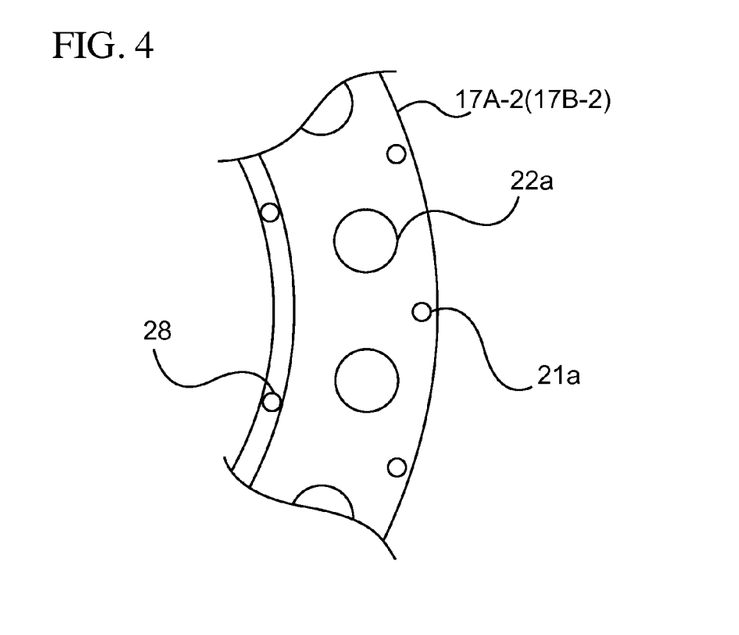
FIG. 4 is a partially enlarged view of an outer tube connection flange portion as viewed from a direction intersecting with a longitudinal direction of the double tube shown in FIG. 3.

FIG. 3 is a schematic diagram showing a configuration of the connecting structure of the double tube, and schematically showing a configuration in a case where the connection flange portion is assembled or disassembled. FIG. 4 is a partially enlarged view of the outer tube connection flange portion as viewed from a direction intersecting with a longitudinal direction of the double tube shown in FIG. 3. In FIG. 4, symbol 21a represents a push-up bolt hole into which the push-up bolt 21 is inserted.

1) Disassembling of Outer Tube

As shown in FIG. 3, the gaps S are created between the outer tube connection flange upper portion 17A-1 and the outer tube connection flange lower portion 17A-2 of the outer tube connection flange portion 16A of the outer tube 11, and between the outer tube connection flange upper portion 17B-1 and the outer tube connection flange lower portion 17B-2 of the outer tube connection flange portion 16B using the push-up bolts 21 as the gap adjusting part, and the outer tube is disassembled. When the inner tube 12 is assembled or disassembled, supply of the gas A from the gas source 25 is stopped.

More specifically, at least one push-up bolt 21 functioning as the gap adjusting part is provided along the outer periphery of each of the outer tube connection flange portions 16A and 16B. As shown in FIG. 4, the push-up bolts 21 are respectively provided closer to outer peripheries of the outer tube connection flange lower portions 17A-2 and 17B-2 relative to the flange bole hole 23A. By rotating the push-up bolt 21, the gaps S are formed between the outer tube connection flange upper portion 17A-1 and the outer tube connection flange lower portion 17A-2 of the outer tube connection flange portion 16A, and between the outer tube connection flange upper portion 17B-1 and the outer tube connection flange lower portion 17B-2 of the outer tube connection flange portion 16B. The number of the push-up bolts 21 is not especially limited, and the number may be set such that the outer tube connection flange portions 16A and 16B can be disassembled and gaps can be formed equally between the opposed outer flanges.

Figure 5:
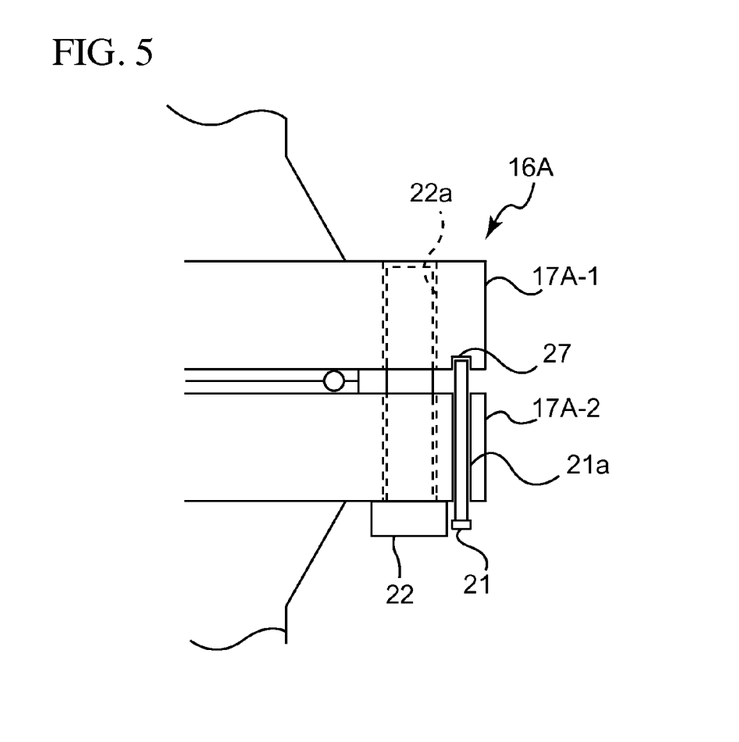
FIG. 5 is a diagram showing a state where an outer tube connection flange upper portion and an outer tube connection flange lower portion are in contact with each other.
Figure 6:
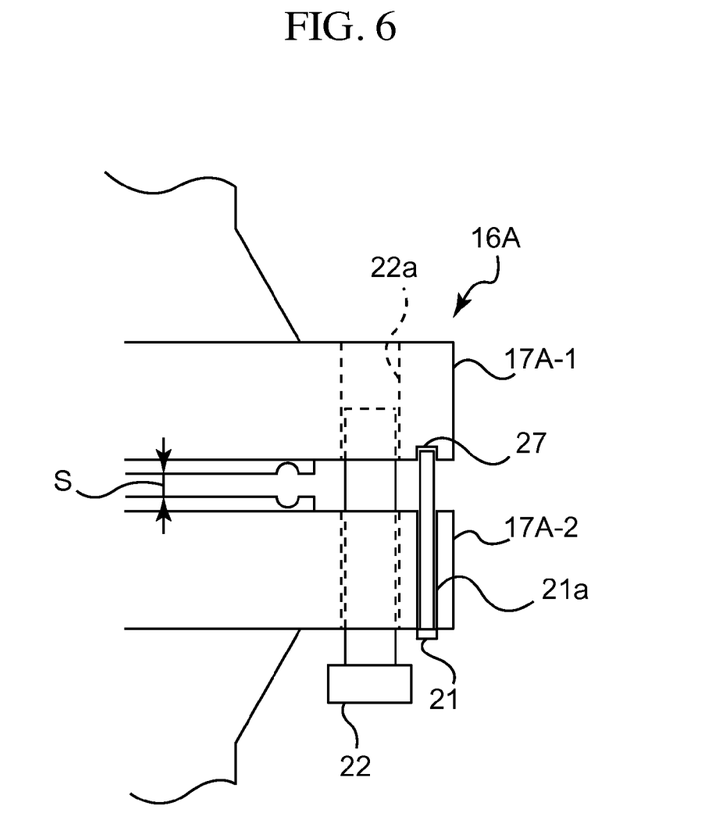
FIG. 6 is a diagram showing a state where a gap is formed between the outer tube connection flange upper portion and the outer tube connection flange lower portion.

FIG. 5 shows a state where the outer flange outer portion and the outer flange lower portion are in contact with each other. FIG. 6 shows a state where the gap is formed between the outer flange upper portion and the outer flange lower portion. In FIGS. 5 and 6, symbol 27 represents a groove where the push-up bolt 21 is accommodated in the outer tube connection flange upper portion 17A-1.

As shown in FIG. 5, when the push-up bolt 21 is rotated from a state where the outer tube connection flange upper portion 17A-1 and the outer tube connection flange lower portion 17A-2 are in contact with each other, the outer tube connection flange upper portion 17A-1 is lifted up and the gap S is formed between the outer tube connection flange upper portion 17A-1 and the outer tube connection flange lower portion 17A-2 as shown in FIG. 6.

The outer tube connection flange upper portion 17B-1 and the outer tube connection flange lower portion 17B-2 of the outer tube connection flange portion 16B also act in the same manner, and when the push-up bolt 21 is rotated, the outer tube connection flange upper portion 17B-1 is lifted up, and the gap S is formed between the outer tube connection flange upper portion 17B-1 and the outer tube connection flange lower portion 17B-2.

Thereafter, the plurality of flange bolts 22 shown in FIG. 2 are disengaged, the outer tube connection flange upper portion 17A-1 and the outer tube connection flange lower portion 17A-2 are disassembled, and the outer tube connection flange upper portion 17B-1 and the outer tube connection flange lower portion 17B-2 are disassembled. Accordingly, the outer tube 11 is disassembled.

Then, the plurality of flange bolts 23 shown in FIG. 2 are disengaged, and the lids 14a are detached from the openings 14 of the'outer tube short cylinder 15.

2) Disassemble of Inner Tube

The connection flange portion 13 of the inner tube 12 is provided with the inner tube 12 at the substantially same position as that of the openings 14. Therefore, bolts and nuts attached to the entire peripheries of the inner tube connection flange upper portion 18-1 and the inner tube connection flange lower portion 18-2 of the connection flange portion 13 of the inner tube 12 while rotating the outer tube short cylinder 15. Accordingly, the inner tube connection flange upper portion 18-1 and the inner tube connection flange lower portion 18-2 can directly be disassembled.

When the inner tube 12 is to be disassembled, the gap S is first formed between the outer tube connection flange portions 16A and 16B of the outer tube 11 using the push-up bolt 21 and the flanges are disassembled, the lids 14a are detached from the openings 14 and then, the inner tube connection flange upper portion 18-1 and the inner tube connection flange lower portion 18-2 of the connection flange portion 13 of the inner tube 12 are directly disassembled while rotating the outer tube short cylinder 15 in the circumferential direction of the inner tube 12, so that the inner tube 12 is disassembled.

Accordingly, when the inner tube 12 is to be disassembled, the inner tube connection flanges of the connection flange portion 13 of the inner tube 12 can directly be assembled or disassembled without cutting the outer tube 11, so that the inner tube 12 can be assembled or disassembled.

In the connecting structure 10A of the double tube according to the present example, a sphere 28 or the like may be put into a groove 27 to prevent positional deviation between the outer tube connection flange upper portion 17A-1 and the outer tube connection flange lower portion 17A-2 of the outer tube connection flange portion 16A, as well as between the outer tube connection flange upper portion 17B-1 and the outer tube connection flange lower portion 17B-2 of the outer tube connection flange portion 16B.

Figure 8:
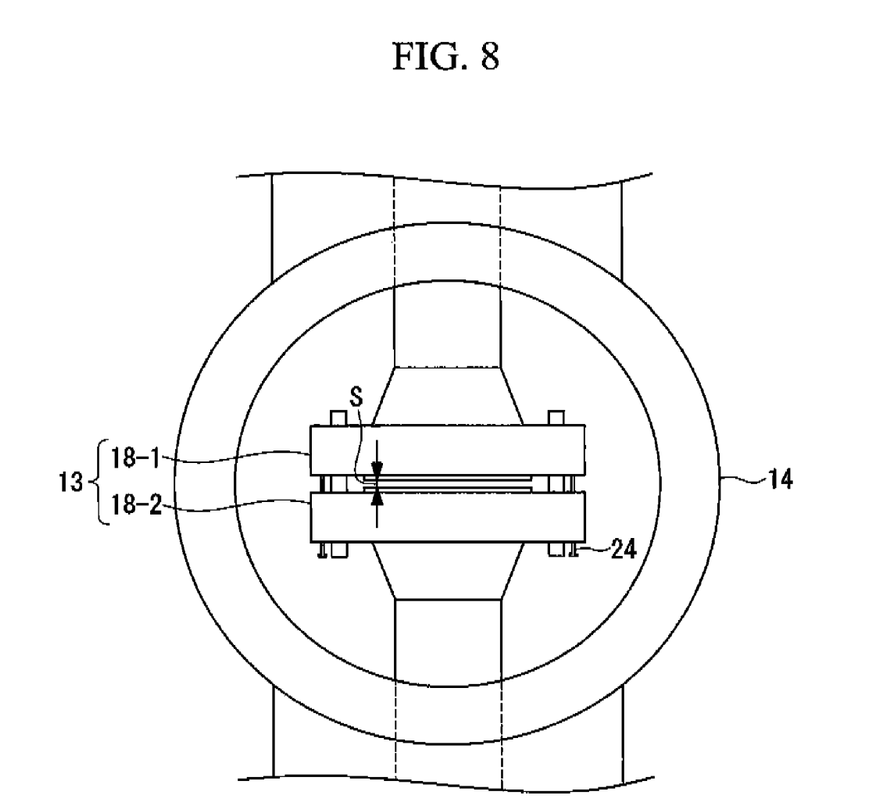
FIG. 8 is a partially enlarged view of an inner tube connection flange portion of the double tube shown in FIG. 3.

In the connecting structure 10A of the double tube of the present example, the inner tube connection flange upper portion 18-1 and the inner tube connection flange lower portion 18-2 of the connection flange portion 13 of the inner tube 12 are fixed and connected to each other using the bolts and nuts, but the present invention is not limited to this example. As shown in FIG. 8, the connection flange portion 13 of the inner tube 12 may have at least one push-up bolt 24 which is provided along each of outer peripheries of the inner tube connection flange upper portion 18-1 and inner tube connection flange lower portion 18-2 and which adjusts the gap S between the opposed two connection flanges. Accordingly, like the outer tube connection flange portions 16A and 16B, the gap S can be formed between the inner tube connection flange upper portion 18-1 and the inner tube connection flange lower portion 18-2 using the push-up bolt 24, and the connection flanges can be disassembled into the inner tube connection flange upper portion 18-1 and the inner tube connection flange lower portion 18-2, so that the inner tube 12 can be assembled or disassembled.

In the connecting structure 10A of the double tube according to the present example, the outer tube connection flange portions 16A and 16B are disassembled using the push-up bolt 21 functioning as the gap adjusting part, and the gaps S are formed between the outer tube connection flange upper portion 17A-1 and the outer tube connection flange lower portion 17A-2, and between the outer tube connection flange upper portion 17B-1 and the outer tube connection flange lower portion 17B-2 of the outer tube connection flange portion 16B, but the present invention is not limited to this example.

Figure 7:
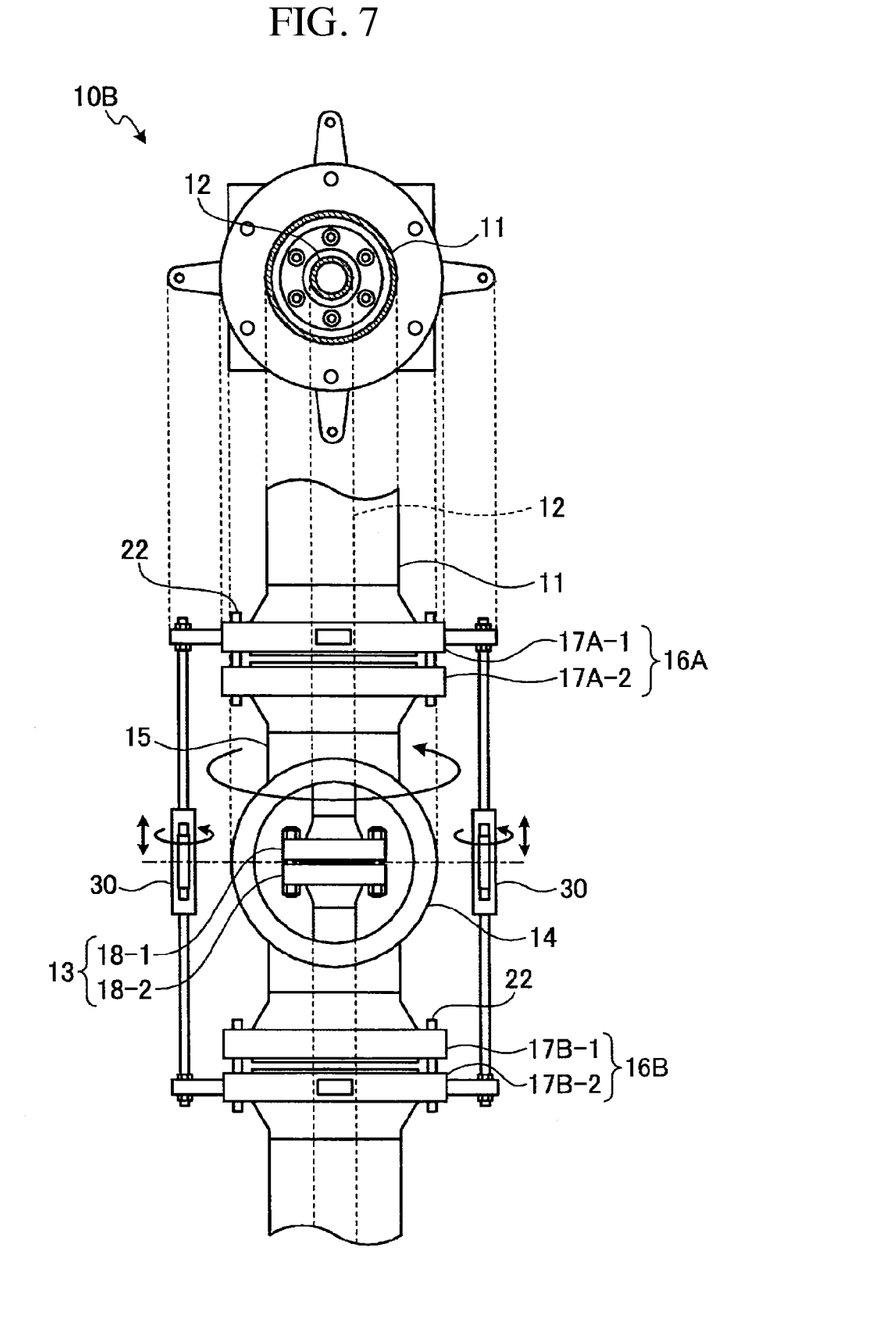
FIG. 7 is a schematic diagram showing another configuration of the connecting structure of the double tube according to the example of the present invention.

FIG. 7 is a schematic diagram showing another configuration of the connecting structure of the double tube according to the present example. FIG. 7 schematically shows the configuration in a case where the connection flange is disassembled.

As shown in FIG. 7, a connecting structure 10B of a double tube according to the present example includes two turnbuckles 30. Of the outer tube connection flange portions 16A and 16B provided on the respective ends of the outer tube short cylinder 15, the turnbuckles 30 connect outer tube connection flanges which are opposed to the outer tube connection flanges on the respective ends of the outer tube short cylinder 15.

That is, according to the connecting structure 10B of the double tube of the present example, as shown in FIG. 7, the outer tube connection flange upper portion 17A-1 of the outer tube connection flange portion 16A and the outer tube connection flange lower portion 17B-2 of the outer tube connection flange portion 16B are connected with each other using the turnbuckles 30.

By rotating the turnbuckles 30, the gaps S can be formed between the outer tube connection flanges constituting the outer tube connection flange portions 16A and 16B. More specifically, the gaps S can be formed between the outer tube connection flange upper portion 17A-1 and the outer tube connection flange lower portion 17A-2 of the outer tube connection flange portion 16A, and between the outer tube connection flange upper portion 17B-1 and the outer tube connection flange lower portion 17B-2 of the outer tube connection flange portion 16B.

Accordingly, like the above case, the gaps S are formed between the outer tube connection flange upper portion 17A-1 and the outer tube connection flange lower portion 17A-2 of the outer tube connection flange portion 16A, and between the outer tube connection flange upper portion 17B-1 and the outer tube connection flange lower portion 17B-2 of the outer tube connection flange portion 16B, and the lids 14a of the openings 14 are opened. Thereafter, the inner tube connection flange upper portion 18-1 and the inner tube connection flange lower portion 18-2 of the connection flange portion 13 of the inner tube 12 are disassembled while rotating the outer tube short cylinder 15 in the circumferential direction of the inner tube 12, and the inner tube 12 can be disassembled.

The procedure for disassembling the inner tube 12 has been described above. When the inner tube 12 is to be assembled, the above procedure should be reversed.

More specifically, in the connecting structure 10A of the double tube according to the present example, the inner tube connection flange upper portion 18-1 and the inner tube connection flange lower portion 18-2 of the connection flange portion 13 of the inner tube 12 are brought into contact with each other, bolts and nuts are attached to the entire peripheries of the inner tube connection flange upper portion 18-1 and the inner tube connection flange lower portion 18-2, the connection flange portion 13 of the inner tube 12 is fixed, and the inner tube 12 is assembled.

The lids 14a are attached on the openings 14 and are fixed using a plurality of flange bolts 23, so that the openings 14 are closed. Thereafter, the push-up bolt 21 is rotated in a direction opposite to a direction in which the outer tube connection flange upper portion 17A-1 is lifted up, the outer tube connection flange upper portion 17A-1 is lifted down, and the outer tube connection flange upper portion 17A-1 and the outer tube connection flange lower portion 17A-2 of the outer tube connection flange portion 16A are brought into contact with each other. Similarly, the outer tube connection flange upper portion 17B-1 and the outer tube connection flange lower portion 17B-2 of the outer tube connection flange portion 16B are also brought into contact with each other. Thereafter, a plurality of flange bolts 22 are attached to the outer tube connection flange portion 16A, and the outer tube connection flange upper portion 17A-1 and the outer tube connection flange lower portion 17A-2 are fixed to each other. The outer tube connection flange upper portion 17B-1 and the outer tube connection flange lower portion 17B-2 of the outer tube connection flange portion 16B are also fixed to each other.

As a result, even in a case where the inner tube 12 is to be assembled, the inner tube 12 can directly be assembled without cutting the outer tube 11.

In the connecting structure 10B of the double tube according to the present example, the connection flange portion 13 of the inner tube 12 are fixed by handling the inner tube connection flange upper portion 18-1 and the inner tube connection flange lower portion 18-2 of the connection flange portion 13 of the inner tube 12 in the same manner as that described above, and the inner tube 12 is assembled.

Thereafter, the lids 14a are attached to the openings 14 and are fixed to the openings 14 using the plurality of flange bolts 23, and the openings 14 are closed. Thereafter, the turnbuckles 30 are rotated in a direction opposite relative to a case where the gaps S are formed between the outer tube connection flanges constituting the outer tube connection flange portions 16A and 16B, and the outer tube connection flange upper portion 17A-1 and the outer tube connection flange lower portion 17A-2 of the outer tube connection flange portion 16A are brought into contact with each other, and the outer tube connection flange upper portion 17B-1 and the outer tube connection flange lower portion 17B-2 of the outer tube connection flange portion 16B are brought into contact with each other. Thereafter, the plurality of flange bolts 22 are attached to the outer peripheries of the outer tube connection flange portions 16A and 16B in the same manner as that described above, so as to fix the flange portions respectively.

Accordingly, even in a case where the inner tube 12 is to be assembled, the inner tube 12 can directly be assembled without cutting the outer tube 11.

According to the connecting structure 10A or 10B of the double tube of the present example, the outer tube connection flange portions 16A and 16B have the push-up bolts 21 or the turnbuckles 30 capable of adjusting the gaps S between the outer tube connection flange upper portion 17A-1 and the outer tube connection flange lower portion 17A-2, and between the outer tube connection flange upper portion 17B-1 and the outer tube connection flange lower portion 17B-2. Therefore, the inner tube connection flange upper portion 18-1 and the inner tube connection flange lower portion 18-2 of the connection flange portion 13 of the inner tube 12 can directly be assembled or disassembled while rotating the outer tube short cylinder 15 having the openings 14, so that the inner tube 12 can be assembled or disassembled. Accordingly, in a case where it is necessary to assemble or disassemble the inner tube 12 in order to repair a damaged portion of the inner tube 12 or the like, the inner tube 12 can directly be assembled or disassembled without cutting the outer tube 11.

According to the connecting structure of the double tube of the present example, since the tube is of the double tube structure, the tube can be used under a high temperature and high pressure condition. Therefore, the tube can be used in a cooling system of a high temperature gas furnace which supplies inert gas such as nitrogen gas or argon gas heated to high temperature by heat emitted from the high temperature gas furnace.

The connecting structure of the double tube used in the present example is not limited to a tube in the cooling system of the high temperature gas furnace, but may be embodied at least with a double tube. The present invention can also be used in other steam turbine or gas turbine equipment such as a pressure vessel, a circulation pump, and a valve.

INDUSTRIAL APPLICABILITY

As described above, according to the connecting structure of the double tube of the present invention, the gaps between the opposed outer tube connection flanges constituting the outer tube connection flange portions on the outer tube can be adjusted. Therefore, when an inner tube is to be assembled or disassembled, the inner tube can directly be assembled or disassembled without cutting the outer tube. Therefore, the present invention can suitably be used in a connecting structure of a double tube having the outer tube and the inner tube.

The invention claimed is:

1. A connecting structure of a double tube comprising:
an outer tube; and
an inner tube inserted into the outer tube, wherein
the outer tube is provided at a location corresponding to a connection flange portion of the inner tube with an outer tube short cylinder and the short cylinder includes at least one opening having a lid,
the outer tube short cylinder is provided at and adjacent respective ends with outer tube connection flange portions,
there is provided a gap adjusting part configured to adjust a size of a pre-existing gap formed between opposed outer tube connection flanges which constitute the outer tube connection flange portions,
the gap adjusting part comprises at least two turnbuckles connecting the outer tube connection flanges which are opposed to flanges of the respective ends of the outer tube short cylinder, and
a connecting mechanism is arranged between the opposed outer tube connection flanges which constitute the outer tube connection flange portions.

2. The connecting structure of a double tube according to claim 1 wherein a connection flange portion of the inner tube has at least one push-up bolt which is provided along each of outer peripheries of two opposed connection flanges of the inner tube and which adjusts a gap between the connection flanges.

\* \* \* \* \*